March 2, 1943.  C. A. COHEN  2,312,751
PREPARATION OF UNSATURATED KETONES
Filed May 8, 1940
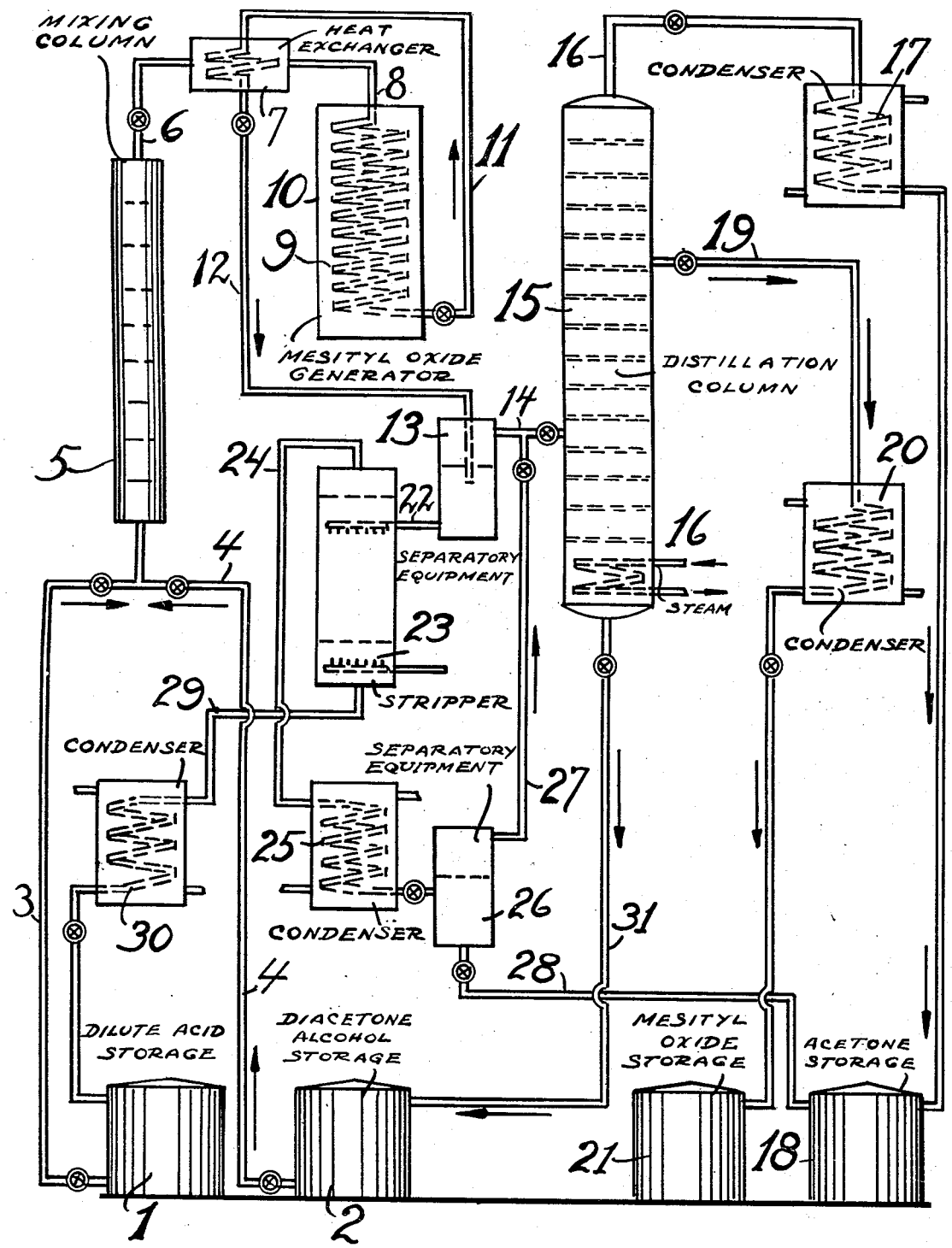
Charles A. Cohen Inventor
By P. L. Young Attorney

UNITED STATES PATENT OFFICE 2,312,751

PREPARATION OF UNSATURATED KETONES

Charles A. Cohen, Elizabeth, N. J., assignor to Standard Oil Development Company, a corporation of Delaware Application May 8, 1940, Serial No. 333,899

11 Claims. (Cl. 260—596)

This invention is concerned with the preparation of unsaturated ketones by the catalytic dehydration of keto-alcohols. The invention is particularly concerned with a continuous process for the preparation of mesityl oxide,

by the dehydration of diacetone alcohol

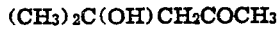

There are two general methods for the preparation of the unsaturated ketones, namely the condensation of the lower saturated ketones and the dehydration of the corresponding keto-alcohols. The condensation processes are unsatisfactory for the reasons that the yields are poor and it is difficult to prevent the formation of undesirable compounds in appreciable quantities. The processes involving the dehydration of keto-alcohols are more generally satisfactory. The present invention is concerned with an improved process for dehydrating keto-alcohols as a means of preparing the corresponding unsaturated ketones.

The dehydration of keto-alcohols is readily effected and proceeds smoothly and rapidly under mild heating and pressure conditions. The keto-alcohol upon dehydration yields equi-molecular quantities of the unsaturated ketone and water. Since these products are both soluble in the keto-alcohol but mutually immiscible, the furtherance of the dehydration reaction is aided after a saturated solution of the reaction products in the keto-alcohol has been formed by the development of a liquid-liquid diphase system. Advantage was taken of this in the prior art by effecting the reaction in presence of an appreciable aqueous phase and therefore in the use of a water-soluble catalyst. It was also found advantageous to have in the reaction system, water in appreciable quantities as a means of diluting the effect of the catalyst and obviating in this manner condensation and depolymerizing reactions.

The dehydration of keto-alcohols is usually effected with the aid of small amounts of dehydrating agents such as sulfuric acid and zinc chloride. The unsaturated ketone is usually separated as formed from the reaction mixture by distillation and subsequent separation in suitable equipment from water also carried overhead. This procedure, while advantageous in many ways, has the disadvantage of increasing the concentration of the less volatile catalyst in the system, due to the distillation of water either before or with the unsaturated ketone as a constant boiling mixture, and thus accelerating the condensing and depolymerizing reactions. It was found that this disadvantage could be obviated by maintaining in the reaction system an appreciable aqueous phase and maintaining the reaction mixture as far as convenient at about the same relative composition. In some cases also water in sufficient quantity was added to form a constant boiling mixture involving the reaction products, that is, an azeotropic mixture consisting of the unsaturated ketone and water is often formed. Later it was found that by heating together the keto-alcohol and the dehydration catalyst, the unsaturated ketone and water as formed could be distilled and separation effected of the unsaturated ketones by separatory devices in the condenser system. In the present invention further improvement in this process is presented.

According to the present invention, the keto-alcohol is mixed with either a dilute aqueous solution of the dehydrating catalyst or a solid dehydrating catalyst in the absence of water and then heated to a temperature above about 100° C. Pressure is maintained on the system to prevent substantial vaporization and to bring about complete dehydration of the keto-alcohol in a period of time between a few seconds and about 30 minutes. The diphase system so formed is passed to separatory equipment wherein the aqueous phase is removed from contact with the unsaturated ketone. The aqueous layer containing the catalyst is usually recycled directly in the treating system if the solution type catalyst is employed, or after separation and subsequent drying if the solid type catalyst is employed.

The catalysts which may be employed in aqueous solution are sulfuric acid, phosphoric acid, hydrochloric acid, zinc chloride, calcium chloride, the alkyl hydrogen sulfates, the alkyl hydrogen phosphates, oxalic acid, and the solid type catalysts which may be employed are zinc oxide, iodine and the various chemically inert solid dehydrating agents such as acid treated clay, pumice and the like. The concentration of the catalysts in aqueous solution is preferably between about 3% and 10%. Higher concentrations of the catalysts in aqueous solution may be employed, but particular care must be exercised in their use to limit the occurrence of condensing the depolymerizing reactions. When the dilute solutions of the catalyst are employed, the volume of the aqueous solutions is about the same as that of the keto-alcohol, although larger or smaller volumes may be employed with advantage in some cases. Dilute sulfuric acid, that is of about 3% concentration, is usually employed, but also highly satisfactory are the acid alkyl salts of sulfuric and phosphoric acids. When the solid dehydrating catalysts are employed, the amount used is between ½% and 10% by weight of the keto-alcohol treated.

The temperatures employed in the invention are above about 100° C., and usually lower than 175° C. The temperature is adjusted so as to bring about the reaction within a relatively short period of time, that is with a suitable type of catalyst from a few seconds to about 10 minutes, but in some cases the temperature is reduced to prevent the occurrence of appreciable condensation reactions and times of reaction up to about 30 minutes can then be advantageously employed. Pressure is regulated so as to prevent appreciable vaporization. Usually the pressure varies from atmospheric to about 100 pounds per square inch. The actual time of reaction within the range from a few seconds to about 30 minutes is dependent upon the temperatures and pressures employed.

The process can be effected discontinuously in a series of steps, but it is usually carried out on a continuous basis with a dehydration catalyst which is effective in aqueous solution. In effecting the dehydration by this preferable procedure, the keto-alcohol together with the aqueous solution of the catalyst are passed through a reaction coil heated to a temperature to cause the dehydration to be effected within a suitable period of time, which is usually of the order from about one to about ten minutes. In order to prevent substantial vaporization of any of the constituents of the reaction mixture, pressures up to 100 pounds per square inch are maintained on the system. The reaction vessel usually consists of a coil made of lead or the coil is lead lined. The diameter of the coil is such that the flow through the coil is turbulent and the length of the coil is such as to bring about the reaction within the desired reaction time. The reaction mixture is then preferably cooled about 10° F. and while under pressure passed to separatory equipment. The upper layer of the unsaturated ketone may be removed and stored or more often is flashed into a distillation tower to obtain the unsaturated ketone in a high degree of purity. The lower aqueous layer containing the catalyst is usually recycled to the catalyst storage vessel.

The keto-alcohols which may be dehydrated by the present process are the keto-alcohols which upon dehydration yield stable unsaturated ketones which are relatively insoluble in water. Thus the present process is applicable for the preparation of mesityl oxide from diacetone alcohol; methyl vinyl ketone from 3-hydroxy butanone-2; methyl allyl ketone from 4-hydroxy pentanone-2; methyl isopropenyl ketone from 3-methyl 4-hydroxy butanone-2; 3-methylpentene-3-one-2 from 3-methyl 4-hydroxy pentanone-2; 5-methyl hexene-4-one-2 from 5-methyl 4-hydroxy hexanone-2; 3-ethyl pentene-3-one-2 from 3-ethyl 4-hydroxy pentanone-2; diisobutenyl ketone from 2,6-methyl 2, 6-hydroxy heptanone-4; 2-hydroxymethyl butene-3-one-2 from alpha, alpha-dimethylol acetone, 3-methyl heptene-3-one-5 from 3-methyl 3-hydroxy heptanone-5; 2,5-dimethylene cyclohexanone from 2,5-dimethylol cyclohexone, and the corresponding unsaturated ketones from homologues, analogues and substitution products of such keto-alcohols.

An understanding of the invention is conveyed by the following description of the manner of operation on a continuous basis. Referring to the drawing in which there is diagrammatically represented suitable equipment for carrying out this particular manner of processing, it is noted that diacetone alcohol is taken as the particular keto-alcohol treated and that sulfuric acid is employed as the catalyst.

From storage vessels 1 and 2 sulfuric acid of suitable concentration, usually about 3%, and diacetone alcohol are passed at a suitable rate at atmospheric temperature through lines 3 and 4 respectively, to a mixing device 5. The mixing unit 5 may be of the type of an orifice, agitator or column fitted with baffle plates or with suitable packing. From the mixing device 5 the mixture is passed through line 6 through a heat exchanger 7 and then through line 8 to the reaction coil 9. The coil 9 is preferably made of lead, but equally advantageous is any lead lined coil or coil of other material suitable for withstanding reaction temperatures, pressures and corrosive effects of the reagents. The size of the coil depends on the feed rate. For a feed rate of about 300 gallons per hour, the coil, for example, has a diameter of about 1 inch and is about 100 feet in length, thereby providing a time of heating in the coil of about a minute. The coil is jacketed by steam bath 10. The temperature in the coil is preferably maintained between about 110° C. and 130° C. and pressures between about 25 and 50 pounds per square inch. The length of time which is taken for the feed rate to pass through the coil usually varies from about 20 seconds to 10 minutes. When the higher temperatures and higher pressures are employed, the shorter contact times may be employed. The reaction mixture is then passed by line 11 through the heat exchanger 7 and then by line 12 to the separatory equipment 13 held under about the same pressure as the reaction coil 9. The amount of cooling effected in the heat exchanger 7 is sufficient to reduce the temperature of the mixture to about 95° C. In the separatory equipment 13, the reaction mixture at a temperature of about 95° C. readily separates into two phases. The upper layer of mesityl oxide is removed and may be passed to storage. When mesityl oxide is to be employed as a chemical intermediate, the material obtained at this stage is sufficiently satisfactory for such additional processing without further purification by distillation. Usually, however, the mesityl oxide in the upper layer is purified by passing through line 14 and flashed into the column 15 to remove traces of water and acetone. The column 15 is a distillation column fitted with bubble plates or filled with suitable packing such as Raschig rings of about ½ inch diameter. The column 15 is heated by a closed steam coil 16. Sufficient temperature is maintained in the column to remove overhead through line 16 and through the condenser 17 to storage 18 small traces of acetone and water. At a suitable point in the column a stream of mesityl oxide is removed through the line 19 to the condenser 20 and then to storage 21. The aqueous layer from the separatory equipment 13 is removed by the line 22 to the stripper 23. In this stripper the aqueous solution is sprayed over suitable packing such as pumice or ceramic material and heated by steam injected through the bottom. As overhead from this column, a mixture of misityl oxide, acetone, water and any unreacted diacetone alcohol is passed by line 24 through the condenser 25 to separatory equipment 26. The upper layer formed in this equipment is passed by line 27 to line 14. The lower layer is removed by line 28 to acetone storage 18. From the column 23 the aqueous solution is passed through line 29 through the condenser 30 to the acid storage vessel 1. From the base of the column 15 the residual material is passed by line 31 to the diacetone alcohol storage vessel 2.

*Example 1*

10 gals. of diacetone alcohol are mixed with 10 gals. of a 3% aqueous sulfuric acid solution. The mixture is thoroughly agitated. The mixture is then passed through a reaction coil heated to a temperature of 105° C. The diameter of the coil is 1 inch, and the length of the coil is about 100 ft. The pressure on the coil is about 10 pounds gauge, and the contact time is about 5 minutes. The reaction mixture was allowed to separate in a separator into two layers. The upper layer consisting of substantially pure mesityl oxide measured about 7.5 gals. The yield of mesityl oxide is about 82.5% of the diacetone alcohol employed. The lower acid layer is flashed distilled obtaining a small percentage of acetone and a further quantity of mesityl oxide. The total yield of mesityl oxide is therefore about 94.5%.

*Example 2*

In another example 6% sulfuric acid was used instead of 3% sulfuric acid. Using the same temperature and equipment as in Example 1, the initial pressure developed in this example is about 18 pounds gauge, but a rate is used which was twice as fast as in the first example. The total yield obtained in this case is 88% by weight.

The unsaturated ketones are thus prepared by a method which eliminates the distillation step in the separation of the ketone from the reaction mixture. The elimination of the distillation step lowers the processing costs and permits the use of more compact manufacturing equipment.

The invention has been described in some detail and several illustrations presented. These have been rendered for purposes of presenting a basic understanding and appreciation of the invention and not with any intention of limiting the invention to the actual details of illustrations presented. It will be obvious to those skilled in the art that equivalents, modifications and variations can be made in the practice of the invention without exceeding the inventive concept.

What is claimed is:

1. The process of preparing unsaturated ketones by the catalytic dehydration of keto-alcohols which comprises heating together the keto-alcohol and the dehydration catalyst at a temperature sufficient to effect substantially complete dehydration of the keto-alcohol in a short period of time and under a pressure to prevent substantial vaporization, and separating the unsaturated ketone from the reaction mixture while in liquid phase.

2. The process of preparing unsaturated ketones by the catalytic dehydration of keto-alcohols which comprises heating together keto-alcohol and an aqueous solution of a dehydration catalyst to a temperature sufficient to effect substantially complete dehydration of the keto-alcohol in a short period of time and under a pressure to prevent substantial vaporization, and separating the unsaturated ketone from the reaction mixture while in the liquid phase.

3. The process according to claim 2 in which sulfuric acid is the catalyst.

4. Process according to claim 2 in which the catalyst is an aqueous solution of sulfuric acid concentration of between 3% and 6%.

5. The process of preparing mesityl oxide by the catalytic dehydration of diacetone alcohol which comprises heating together diacetone alcohol and an equal volume of 3% aqueous solution of sulfuric acid to 105° C. and under a pressure of about 10 pounds gauge, and separating from the liquid reaction mixture the mesityl oxide so formed.

6. The continuous process of preparing unsaturated ketones by the catalytic dehydration of keto-alcohols which comprises agitating the keto-alcohol with the dehydration catalyst, passing the resultant mixture through a coil heated to a temperature sufficient to effect substantially complete dehydration of the keto-alcohol in a short period of time and under a pressure to prevent substantial vaporization, and separating the unsaturated ketone from the reaction mixture.

7. The continuous process of preparing unsaturated ketones by the catalytic dehydration of keto-alcohols which comprises mixing the keto-alcohol and a dilute aqueous solution of the dehydration catalyst in about equal volumes, passing the mixture through a coil heated to a temperature sufficient to effect substantially complete dehydration of the keto-alcohol in a short period of time and under a pressure to prevent substantial vaporization, and separating the unsaturated ketone while in the liquid phase from the reaction mixture.

8. The continuous process according to claim 7, in which the dehydration catalyst is sulfuric acid.

9. The continuous process according to claim 7, in which the dilute aqueous solution of the dehydration catalyst is a sulfuric acid mixture of between 3% and 6% concentration.

10. The continuous process of preparing mesityl oxide by the catalytic dehydration of diacetone alcohol which comprises mixing diacetone alcohol and an aqueous solution of 3% to 6% sulfuric acid in about equal volumes, passing the mixture through a lead-lined coil of dimensions to maintain turbulent flow and a contact time of between about 5 and 10 minutes, heated to a temperature between about 105° C. and 120° C. and under a pressure between about 10 and 20 pounds gauge, separating the mesityl oxide while in the liquid phase from the reaction mixture and recycling the aqueous solution for admixture with further quantities of diacetone alcohol.

11. The continuous process of preparing highly purified mesityl oxide which comprises mixing diacetone alcohol and an aqueous solution of 3% sulfuric acid in about equal volumes, passing the mixture through a lead-lined coil of dimensions suited to maintaining therein turbulent flow and a rate to provide a contact time of about 5 minutes and heated therein to a temperature of between 105° C. and 110° C. and under a pressure between about 10 and 15 lbs. gauge, separating the mesityl oxide while in the liquid phase from the mixture, distilling and collecting the thus purified mesityl oxide and recycling the aqueous solution to the dilute sulfuric acid supply system.

CHARLES A. COHEN.